United States Patent [19]

Instone et al.

[11] Patent Number: 4,566,404
[45] Date of Patent: Jan. 28, 1986

[54] ANIMAL CONVEYANCE CAPABLE OF CONVERSION INTO AN AIR FREIGHT CONTAINER

[75] Inventors: Giles A. Instone; Jeremy A. Instone, both of London, England

[73] Assignee: Solindo Equipment Leasing Ltd., London, England

[21] Appl. No.: 600,624

[22] Filed: Apr. 16, 1984

[51] Int. Cl.⁴ .............................................. A01K 1/00
[52] U.S. Cl. ........................................ 119/8; 119/15; 119/27
[58] Field of Search ...................... 119/7, 8, 9, 10, 11, 119/20, 27, 17, 15, 18; 296/24 C

[56] References Cited

U.S. PATENT DOCUMENTS

| 510,416 | 12/1893 | Fenton | 119/7 X |
| 2,621,070 | 12/1952 | Crivella | 119/10 X |
| 2,764,127 | 9/1956 | Newman | 119/20 |
| 2,779,489 | 1/1957 | Boom | 119/82 X |
| 3,727,581 | 4/1973 | Brent | 119/17 |

Primary Examiner—Hugh R. Chamblee
Attorney, Agent, or Firm—Pollock, Vande Sande & Priddy

[57] ABSTRACT

Conveyance for the transportation of horses by air, comprising a generally rectangular box-like structure defining an enclosure for at least two horses, the enclosure having a front wall, a rear wall, two side walls, a floor and a roof. The front wall is hingedly connected to the floor so as to be selectively utilizable as a ramp for off-loading horses from the enclosure, and a central portion of the rear wall is hingedly connected to the floor so as to be selectively utilizable as a ramp for loading horses into the enclosure, locking means associated with the front wall and with the rear wall central portion for securing the same in upright condition for closing the enclosure, and demountable partitioning defining a plurality of separate compartments within the enclosure including at least two compartments for horses extending alongside one another in a direction from the rear wall towards the front wall, the partitioning being assemblable within the enclosure at a plurality of different positions and being stowable adjacent at least one of the side walls of the enclosure for use of the conveyance as an air freight container.

20 Claims, 11 Drawing Figures

ANIMAL CONVEYANCE CAPABLE OF CONVERSION INTO AN AIR FREIGHT CONTAINER

FIELD OF THE INVENTION

The present invention relates to the conveyance of livestock, particularly though not exclusively horses, and more particularly is directed to a conveyance for two or more horses or similarly sized animals which is capable of being converted into a freight container and, more especially, an air freight container.

BACKGROUND OF THE INVENTION

The transportation of horses by air is now common place, particularly to and from the United States of America which is a center of excellence in the bloodstock industry. The reasons for this are many and include the increasingly attractive prizes offered for various horse races around the world, the transfer of horses between studs for breeding purposes, and movements resulting from ownership transfers.

The ever increasing high value of bloodstock dictates that great care should be taken during its transportation by air. However, to date, horses and other animals individually valued in millions of dollars have generally been transported in little more than large wooden crates regardless of their value, and little thought has been given to their comfort while in flight. Animals have in the past broken out of these crates during their transport, with consequent risk of injury or even death to the animal and possible damage to the conveying aircraft.

Thus, there is a considerable need for a well designed conveyance for use in the transportation of horses by air. Furthermore, it is desirable that these conveyances be capable of multi-functional use, such that they need not be transferred empty from one country to another merely to pick up livestock there, thus wasting valuable cargo space on the transferring plane or ship. Therefore, a conveyance designed for the transportation of horses and other livestock by air and capable of being converted into a freight container would be of great utility.

SUMMARY OF THE INVENTION

According to the present invention, a conveyance for the transportation of two or more horses or like sized quadrupeds by air is provided which can be converted into a freight container by the rearrangement within the conveyance of various demountable partitions. When the invention is being used as a horse box, these partitions will be set up to define separate compartments within the box for each of the horses being transported, and in one preferred embodiment, also for a groom who may travel with the horses to ensure their safe and contented passage. The partitioning is arranged to be readily disassembled and stored along the walls inside and/or outside the box, which results in the box being capable of containing freight of substantially the same volume as its interior.

The conveyance may be in the form of a rectangular box having a floor, a roof, and four walls supporting the roof. Two of the walls, which are at opposite ends of the box, preferably comprise ramps which can be raised vertically upright to form at least a part of the respective walls, and can be lowered to provide an access to the box at one end and an exit from the box at the opposite end. By virtue of this arrangement, the horses do not have to be backed out of the box. Advantageously, when the two ramps are raised, their tops extend short of the roof, thus providing for ventilation within the box.

The demountable paritions which separate the horse compartments from each other are held in place by, for example, fixing each of their vertical ends to poles held upright by releasable co-operation with retaining means in the floor and the roof of the box. This is preferably arranged such that each pole may be separately released from its retaining means, thus allowing the respective partition to be pivoted about the other pole. This pivoting motion advantageously allows the horses to be entered one at a time into their respective compartments and the compartment then to be closed to contain the horse and prevent it from kicking any subsequently entered horse or its accompanying groom; in the past this has been the cause of injuries to both horses and grooms. This pivoting action of the internal partitions can be advantageously complemented by having a narrow access ramp of a width approximating to the width of one horse compartment only, while the exit ramp can be the full width of the box.

In a preferred embodiment of the invention which is particularly adapted for use as a horse-box, a groom's compartment is adapted to be partitioned off from each of the horse compartments for use by a groom in attending to the horses. In this embodiment, at least one, and preferably both of the side walls of the box include a door providing access for the groom to the groom's compartment, such that he can enter and leave the box without having to make use of either ramp. The partition separating the groom's compartment from the horses' compartments advantageously extends from the floor of the box or from a little above the floor to about half to two-thirds of the way up the box, so that the horses in the box can be inspected and attended to by the groom from his portion of the box, and it advantageously comprises a door which is openable to each of the horse compartments so that the groom, if desired, can access any of the horse compartments from the groom's compartment. The doors also enable the horses to be individually off-loaded from their respective compartments.

Demountable reinforcing bars are desirably provided at appropriate locations within the conveyance, for example to strengthen the partition aforementioned which separates the groom's compartment from the horses' compartments.

Other features and advantages of the invention will become apparent from the following detailed description with reference being made to the accompanying drawings which show various views of an exemplary embodiment which is especially suitable for the conveyance of horses.

DESCRIPTION OF PREFERRED EMBODIMENTS

Figure 1:
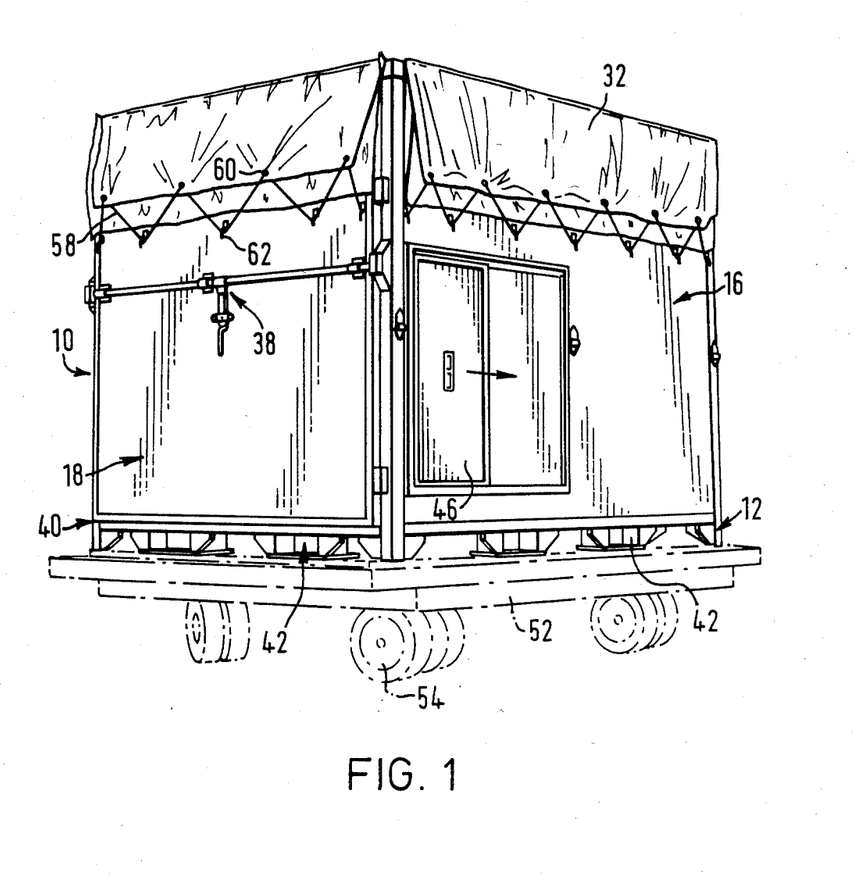
FIG. 1 is a perspective view of a conveyance in accordance with the present invention shown in its freight container mode and mounted on a wheeled dolly which is not part of the conveyance.
Figure 2:
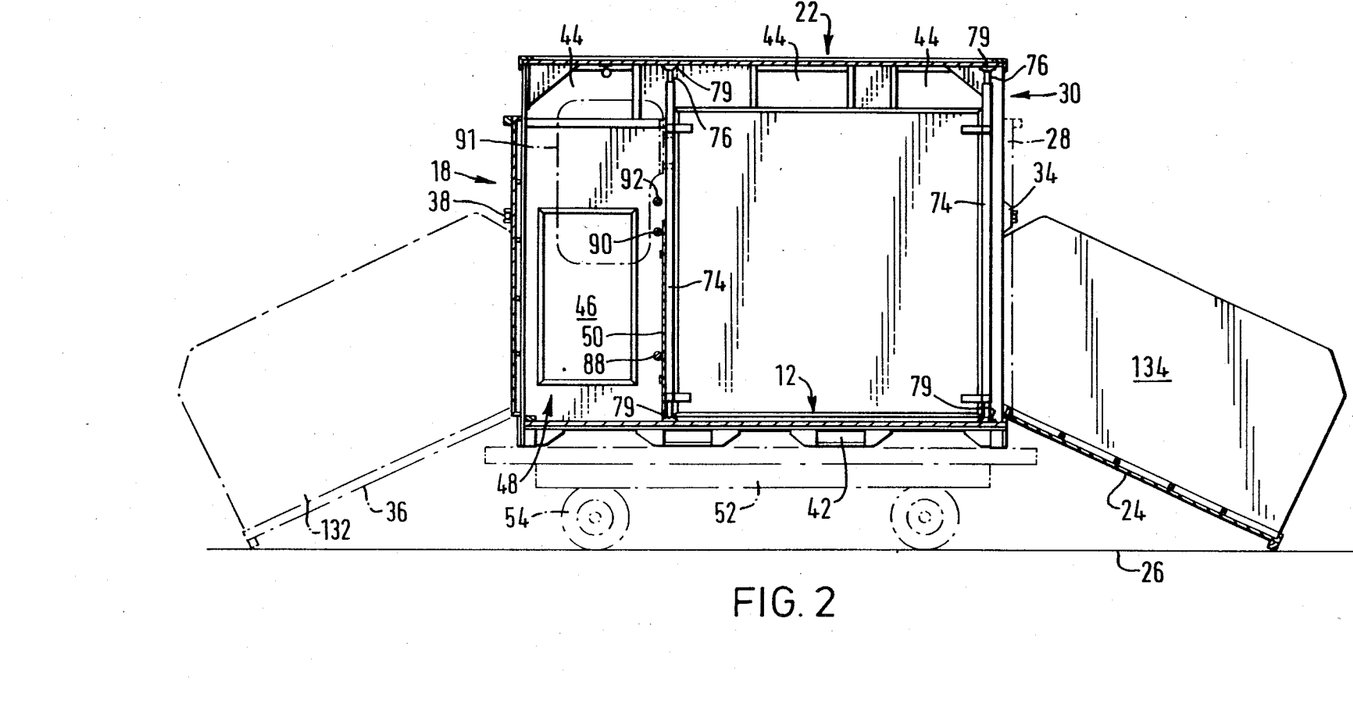
FIG. 2 is a side elevational view, in section, of the box of FIG. 1 with its rear ramp lowered (and shown in phantom lines in its raised position) and its front ramp raised (and shown in phantom lines in its lowered position)
Figure 3:
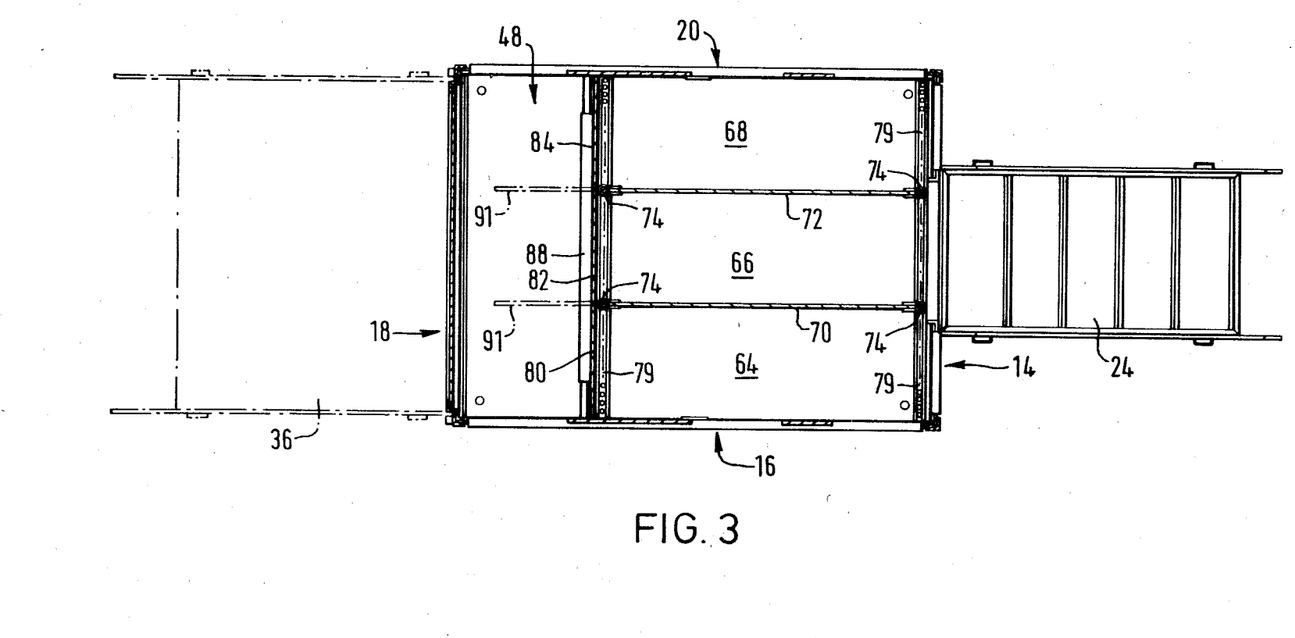
FIG. 3 is a plan view in section of the box of FIG. 2.

Turning now to the drawings, and particularly to FIGS. 1, 2 and 3, a box or container 10 in accordance with the present invention is illustrated. The box has a base 12, four walls 14, 16, 18 and 20 and a roof 22.

The rear wall 14 includes a ramp 24, which is about half as wide as the rear wall, located centrally on this wall. The ramp 24, which is hinged along its bottom edge to the base of the box, may be lowered to the ground 26, as shown in FIGS. 2 and 3, to permit access to the box, or may be fully raised, as shown in phantom lines in FIG. 2 at 28 to close the box so as to prevent horses within the box from escaping. The ramp 24 may be locked in its raised state by latching means 34. There is a gap 30, left between the raised ramp and the roof 22, to allow for the ventilation of the box. When used as a freight container, these gaps are covered by a tarpaulin 32 so as to prevent water and especially rain from entering the box and soaking any freight contained therein. The tarpaulin is secured to the box by means of a suitable rope 58 threaded through holes 60 in the tarpaulin and around clips 62 attached to the exterior walls of the box.

The whole of the front wall 18 of the box is formed by another ramp 36, which when lowered provides an exit route for the horses, and when raised may be secured to form the wall by latching means 38. The ramp 36 is hinged to the base along its bottom edge 40, and, when raised, extends short of the roof so as to leave a gap therebetween to provide for the ventilation of the box.

Figure 4:
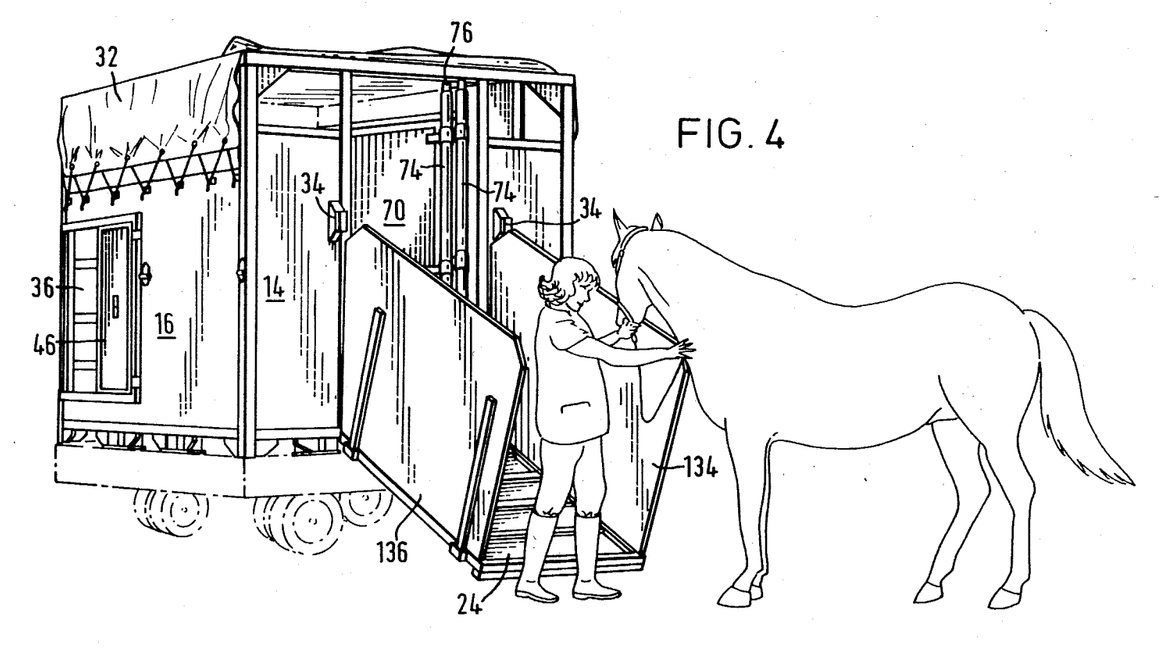
FIG. 4 is a perspective view showing the manner in which a horse is loaded into the box of FIG. 2.
Figure 6:
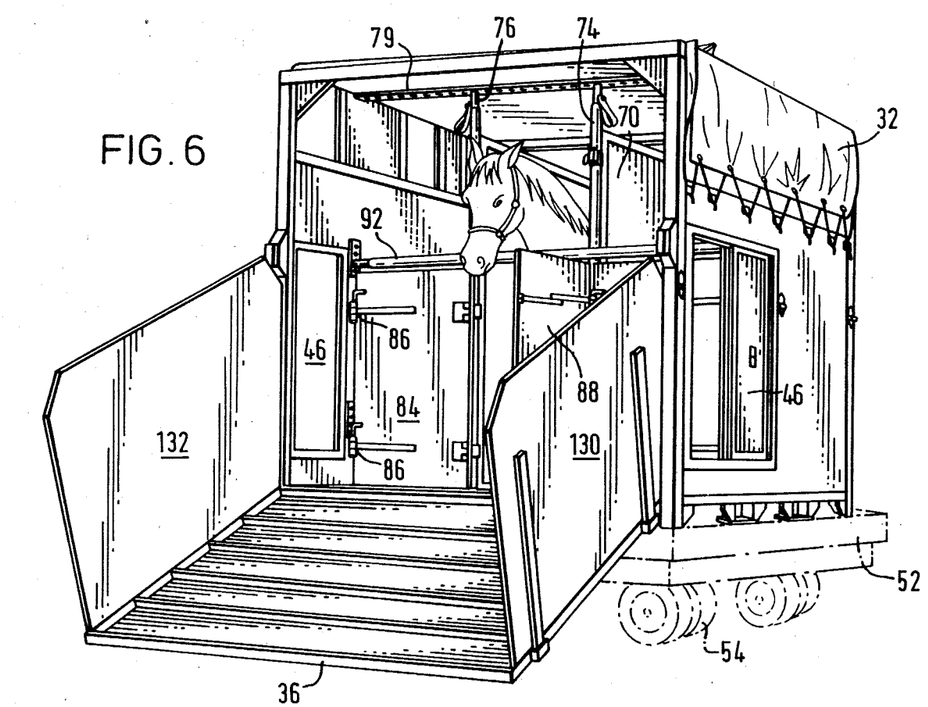
FIG. 6 is a perspective view showing the interior of the box of FIG. 1 when in use as a horse-box and with the front (exit) ramp lowered.

The ramps 24 and 36 when in use for loading and unloading horses, have side wings 130, 132 and 134, 136, respectively, demountably attached to both their sides as best shown in FIGS. 4 and 6. Since the two ramps are of the same length, only one pair of wings is required for both the front and rear ramps. These wings prevent horses from bolting off the ramp and possibly injuring themselves. When not in use, the side wings can be stowed either inside the box or on the outside of the box.

The side walls 16 and 20 both extend from the base to the roof, with gaps 44 (see FIG. 2) adjacent the roof being provided along each of the sides to provide for further ventilation. Each side includes a sliding groom door 46, which allows the groom to enter and leave the box without having to make use of either ramp. This door provides access to a groom compartment 48 at the front of the box, from which the groom may watch over the horses during the flight. The groom compartment 48 is separated from the horses by a demountable partition 50, which extends from the floor to a height sufficient to stop the horses from entering the groom compartment while the partition is in place, e.g., of the order of one-half to two-thirds the height of the box.

The base of the box is provided with members defining recesses 42 extending from and below the base, a pair of said recesses being defined adjacent to each of the side walls of the box for co-operation with the forks of a lifting machine, so that the box may be moved by means of such a machine.

The box may usefully be placed on a wheeled dolly 52, so that the whole assembly can be moved around on the ground when so required, e.g., in moving animals from airport buildings to a loading station on or adjacent the runway. Locking means (not shown) may be provided for securing the box to the dolly.

When in use as a horse box or for the conveyance of other livestock, the inside of the box is divided as shown in FIG. 3 into compartments 64, 66, 68 for each horse and a compartment for the groom 48. The horses are separated from each other by rigid though demountable partitions 70, 72 which extend from the floor of the box to just short of the roof, as may be seen in FIG. 2. The partitions 70, 72 are attached to metal poles 74 along each of their vertical edges and, as is shown most clearly in FIG. 7, these poles each have a portion 76 biased longitudinally outwardly at each of their ends. The portions 76 are each designed to co-operate with a selected one of a series of apertures 77 formed in metal strips 79 extending across the floor and the ceiling of the box, so as to enable the poles and hence the partitions to be positioned as desired within the box. The biased portions 76 of the poles 74 are partially retractable within the respective pole by manually pulling on a strap 78 (see FIG. 7) for the purpose of releasing the respective pole from the strips 79 and thereby enabling the partitions to be moved and demounted. The retractable portions 76 can be releasably locked in their retracted positions. When the pole holding one end of a partition is freed in this way, then the whole partition may be pivoted bodily about the pole attached to its other end. This enables the horses to be entered more easily into their designated compartments, as will be explained later.

The horses are restrained from entering the groom's compartment by the partition 50, which can be seen from FIG. 3 to be made up of sub-partitions 80, 82, 84 each extending across the front of a respective one of the horse compartments. The outer sub-partitions 80, 84 are demountably attached to the side walls of the box by hinge means 86, and the central sub-partition 82 is similarly hinged to each of the outer sub-partitions. By virtue of this arrangement, each of the sub-partitions constitutes a door which can be opened on a hinge at either of its two vertical edges, or which can be selectively demounted altogether.

When horses are in transit, rigid reinforcing bars 88, 90, 92 are placed in front of and just above the partition 50. The bars 88, 90, 92 advantageously are the same as the metal poles aforementioned which are used for securing the partitions 70, 72. When the horses are to be removed from the compartments, these bars are first removed, so that the sub-partitions can be separately opened to allow the removal of each horse individually.

Figure 7:
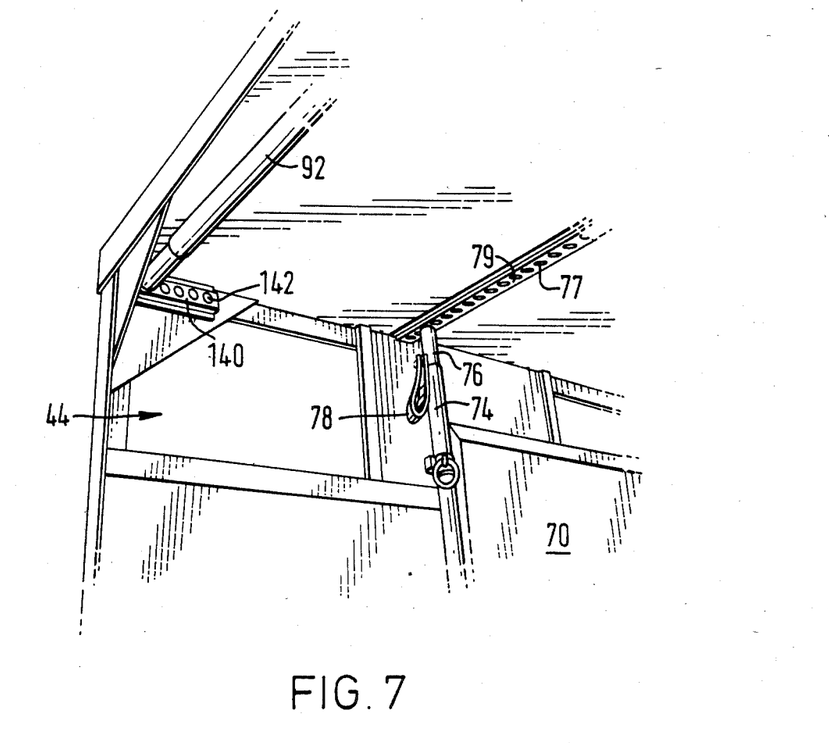
FIG. 7 is a perspective view showing how the reinforcing rods at the rear of the groom's compartment may be stored, and how the poles holding up the large partitions may be releasably fastened to the roof.

The manner in which the bars 88, 90, 92 are stored during the use of the box as a freight container is shown in FIG. 7. Two brackets 140 having a series of circular apertures 142 are located on the side walls in the top front corners of the box. The bars are positioned between these two brackets, with their spring biased ends located in the apertures.

In some instances, it is preferable that the horses not be able to see or interfere with each other. In this case, vertical screens 91 are fixed to the poles supporting the partitions dividing the horses. These screens extend over the groom's space along the longitudinal axis of the box such that, even if the horses extend their heads over the upper bar 92, they will not be able to see each other and cannot bite each other.

The manner in which the box may be cleared for carriage of freight and then adapted for carrying horses, and the loading and unloading of the horses will now be explained, with particular reference to FIGS. 5A to 5E.

Figure 5A:
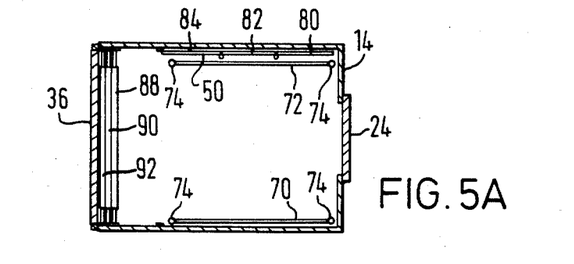
FIGS. 5A to 5E are sectional plan views showing the various stages needed to convert the box from a freight container and to load and offload a plurality of horses into and from the box.
Figure 5B:
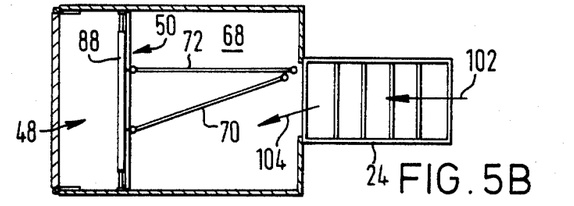
Figure 5C:
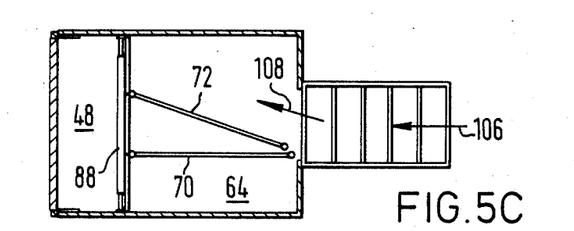
Figure 5D:
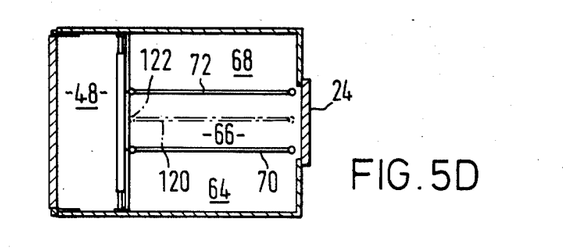

In FIG. 5A the box is seen in plan view with the partitions 50, 70, 72 and bars 88, 90, 92 stowed along the walls and roof, respectively, of the box. This arrangement leaves the central portion of the box free to carry cargo, and thus the box may be used as a freight container. To convert the box into a horse box to receive three horses, for example, the front partition 50 is assembled across the front end of the box and attached to both side walls of the box, and the partitions 70, 72 are positioned as shown in FIG. 5B, with partition 72 having both its associated supporting poles 74 fixed at their ends to the metal strips 79 on the floor and roof of the box, thus rigidly fixing it, and partition 70 fixed only at its front end so that it may be pivoted about its front end to the position shown. With the narrow rear ramp 24 in its down position, a horse can then be led up the ramp 24, as shown by the arrow 102 in FIG. 5B, and placed in the right hand compartment 64 (arrow 104) between partition 70 and wall 16. Partition 70 is then pivoted about its front pole and fixed as shown in FIG. 5C, thus containing the first horse in the compartment 64. The pole at the rear of partition 72 is then freed, and the partition is pivoted as shown in FIG. 5C. A second horse is then led up the ramp 24, as indicated by arrows 106 and 108, and positioned between partition 72 and wall 20. Partition 72 is then swung about its front pole to the position shown in FIG. 5D, and the second horse becomes contained in compartment 68. A third horse can then be led up the ramp 24 and positioned in compartment 66. The ramp 24 is then raised and locked in place by means of latch 34, thereby ensuring that the horses cannot escape back down the ramp 24. It will be appreciated that this arrangement ensures that each horse is loaded into its own compartment of the box without interference from other horses already in the box.

The loading of other numbers of horses can be readily accomplished. For example, if only two large horses are being loaded, then a single partition 120 can be used, which may be pivoted about a pole 122 to position the two horses to its left and its right. The described means whereby the partitions are secured enables the number of compartments and their relative widths to be varied as desired.

Figure 5E:
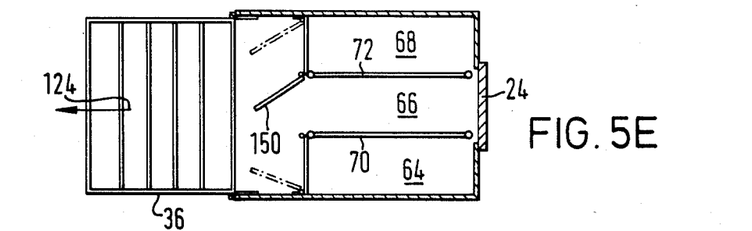

The horses are generally unloaded one at a time by first removing the reinforcing bars between the horse compartments and the groom compartment and then opening the sub-partition in front of each horse compartment in turn, as indicated in FIG. 5E. The horses are led down the lowered ramp 36 as indicated by arrow 124.

The use of a narrow ramp 24 at the rear of the box, as shown in FIG. 4, ensures that each horse may be positively directed into its own compartment of the box and secured there before the next horse is brought in. If a wide ramp were to be used, as at the front end of the box, then it would not be so easy to guide each horse into its own compartment and to contain it in the box before the next horse is brought in.

As those skilled in the art will realize, the present invention may be used to carry livestock and freight simultaneously. This may be achieved, for instance, by loading a horse into a side compartment, and then, having stowed the partitioning which would form the unwanted compartments to the other side, placing freight in the space so cleared. Also the groom's compartment could be used either entirely or in part for the carriage of freight while a horse is.

The word ramp, as used herein, is not to be construed as being limited to a walkway displaced from the horizontal, but covers all walkways regardless of inclination.

There has thus been described a useful and versatile container adapted for a dual function role either as a horse-box for use in the carriage of horses by air, or as an air freight container. The container may be advantageously structured of suitable strong and lightweight materials so as to comply with the national and international regulations governing the carriage by air of both livestock and freight.

We claim:

1. A reusable conveyance for the transportation by air of at least two horses or like-sized quadrupeds, the conveyance being formed of strong and lightweight materials for compliance with regulations governing the carriage by air of both livestock and freight and comprising an internal chamber defined by four walls, a base and a roof, a first wall portion of said chamber formed to be selectively utilizable as a ramp for loading horses into said chamber, a second wall portion of said chamber at a different part of said chamber formed to be selectively utilizable as a ramp for off-loading horses from said chamber, and partitioning demountably secured within said chamber for defining at least two compartments wherein horses may be housed separately from one another and a further compartment for an attendant servicing horses in said at least two compartments, said partitioning enabling an attendant in said further compartment to access each of said at least two compartments from said further compartment, selectably releasable cooperating fixing means provided on said partitioning and in said chamber providing for the demountable securement of said partitioning at locations appropriate for use of the conveyance for the carriage of animals and enabling said partitioning to be demounted to free substantially the entire chamber of internal divisions for readily adapting the conveyance for the carriage of freight when not being used for the carriage of animals, and door means for providing access to said further compartment from outside of said conveyance when said ramps are not deployed.

2. A conveyance according to claim 1, wherein said loading and off-loading ramps are defined by wall portions at opposite ends of said chamber, said at least two compartments for horses have a longitudinal extent in the direction extending between said opposite ends of said chamber, and said further compartment for an attendant extends transversely to said direction adjacent the end of said chamber wherefrom the horses are off-loaded.

3. A conveyance according to claim 1, wherein said partitioning includes an openable door between each of said at least two compartments for horses and said further compartment for an attendant whereby said attendant can access said at least two compartments for horses by entering the same.

4. A conveyance according to claim 2, wherein said partitioning includes an openable door between each of said at least two compartments for horses and said further compartment for an attendant whereby said attendant can access said at least two compartments for horses by entering the same.

5. A conveyance according to claim 2, wherein removable reinforcing members are provided adjacent that section of said partitioning which separates the horses' compartments from the attendant's compartment.

6. A conveyance according to claim 5, wherein the partitioning defining said at least two compartments for horses includes partitioning which is pivotally mounted for guiding horses entering the chamber into respective compartment regions thereof.

7. A conveyance according to claim 6, wherein the said wall portion at said one end of said chamber which is selectively utilizable as a ramp for loading horses into the chamber has a width which is less than the width of the chamber.

8. A conveyance according to claim 7, wherein said partitioning defines three compartments for horses and includes two pivotally mounted longitudinally extending partitioning sections each of which can be pivoted such that the end thereof which is adjacent said one end of said chamber can be positioned selectively adjacent either side of said ramp for loading horses.

9. A conveyance according to claim 1, wherein said fixing means is adapted to enable said partitioning to be mounted in a plurality of different arrangements within said chamber.

10. A conveyance according to claim 9, wherein said fixing means comprises vertically extending support poles which are attached to spaced apart end edges of partitioning panels, at least one end of each said support pole having a portion which is retractable against spring bias, and tracking members having formations for receiving said retractable portions extending across the width of said chamber on a floor surface and on an inner roof surface thereof, the arrangement enabling said partitioning panels to be erected at any one of a plurality of locations within said chamber.

11. A conveyance according to claim 10, wherein said retractable portions can be locked in their retracted condition.

12. A reusable conveyance for the transportation by air of at least two horses or like-sized quadrupeds which is additionally adapted for use as an air freight container, the conveyance comprising an internal chamber, a wall portion at one end of said chamber formed to be selectively utilizable as a ramp for loading horses into said chamber, a wall portion at an opposite end of said chamber formed to be selectively utilizable as a ramp for off-loading horses from the chamber, and partitioning within the chamber for defining at least two compartments wherein horses may be housed separately from one another, said partitioning being capable of being rearranged to free substantially the entire chamber of internal divisions for adapting the conveyance for the carriage of freight when not being used for the carriage of animals, and said partitioning comprising at least one panel having spaced apart end edges which are attached to vertically extending support poles, at least one end of each of said support poles having a portion which is retractable against spring bias, and tracking members having formations for receiving said retractable portions being provided extending across the width of said chamber on a floor surface and on an inner roof surface thereof, the arrangement enabling said at least one panel to be erected at any one of a plurality of locations within said chamber.

13. A conveyance according to claim 12, wherein said retractable portions can be locked in their retracted condition.

14. A reusable conveyance for the transportation by air of at least two horses or like-sized quadrupeds, the conveyance being formed of strong and lightweight materials such as to comply with regulations governing the carriage by air of both livestock and freight and comprising an internal chamber, a wall portion at one end of said chamber formed to be selectively utilizable as a ramp for loading horses into said chamber, a wall portion at an opposite end of said chamber formed to be selectively utilizable as a ramp for off-loading horses from the chamber, and partitioning demountably secured within the chamber for defining at least two compartments wherein horses may be housed separately from one another, selectably releasable cooperating fixing means provided on said partitioning and in said chamber providing for the demountable securement of said partitioning in locations appropriate for use of the conveyance for the carriage of animals and enabling said partitioning to be demounted to free substantially the entire chamber of internal divisions for readily adapting the conveyance for the carriage of freight when not being used for the carriage of animals.

15. A conveyance for the transportation of horses by air, comprising a generally rectangular box-like structure defining an enclosure for at least two horses, said enclosure having a front wall, a rear wall, two side walls, a floor and a roof, said front wall being hingedly connected to said floor so as to be selectively utilizable as a ramp for off-loading horses from the enclosure and a central portion of said rear wall being hingedly connected to said floor so as to be selectively utilizable as a ramp for loading horses into the enclosure, locking means associated with said front wall and with said rear wall central portion for securing the same in upright condition for closing the said enclosure, and demountable partitioning defining a plurality of separate compartments within said enclosure including at least two compartments for horses extending alongside one another in a direction from the rear wall towards the front wall of said enclosure and a groom's compartment extending adjacent said front wall of the enclosure transversely across the enclosure between the side walls thereof and across the front of the horse compartments, said partitioning being assemblable within the enclosure at a plurality of different positions and being stowable adjacent at least one of the side walls of the enclosure to free substantially the entire enclosure of internal divisions for adapting said conveyance for the carriage of freight, and a door being provided in at least one of said enclosure side walls for enabling access to said groom's compartment.

16. A conveyance according to claim 15, wherein the partitioning separating the groom's compartment from the horses' compartments comprises doors openable to provide access to each of said horses compartments from the groom's compartment.

17. A conveyance according to claim 15, wherein the demountable partitioning includes panel sections separating the horse compartments from each other and said panel sections are arranged to be selectively pivotable generally about their front vertical edges for guiding horses more readily into the respective compartments.

18. A conveyance complying with U.S. regulations governing the carriage by air of both livestock and freight and useful both for the transportation of three horses and for the carriage of air freight, said conveyance comprising a generally rectangular box-like structure defining an enclosure for three horses, said enclosure having a front wall, two side walls, a rear wall, a floor and a roof, a central portion at least of said rear wall being hingedly connected to said floor to define a ramp for loading horses into said enclosure, locking means associated with said ramp for securing the same in upright condition for closing the said enclosure, first and second partitions within said enclosure extending generally parallel with the side walls thereof for defining three horse compartments, the said first and second partitions each being mounted so as to be pivotal about their vertical front ends after release of locking means provided at their vertical rear ends whereby the loading of horses into their respective compartments is facilitated, and a further partition provided transversely across the front of said first and second partitions for defining a groom's compartment at the front of said enclosure, at least one door being provided in a side wall of said enclosure for enabling access to be obtained to said groom's compartment, and all of said partitions being demountable and stowable within the enclosure for use of the enclosure as an air freight container.

19. A conveyance according to claim 18, wherein doors are provided in said further partition between the groom's compartment and the horses compartments, and the front wall of said enclosure is arranged to be selectively utilizable as a ramp for off-loading horses from the front of the enclosure.

20. A conveyance according to claim 19, wherein side wings are provided for said ramps, said side wings being demountable for when said ramps are not being used.

* * * * *